United States Patent [19]
Shiber

[11] 3,881,783
[45] May 6, 1975

[54] FIXED SLIP HYDRAULIC ANTI-LOCK BRAKING SYSTEM
[75] Inventor: Samuel Shiber, Mundelein, Ill.
[73] Assignees: Benjamin Ron, New York, N.Y.; Royce H. Husted, Wheaton; Samuel Schiber, both of Ill.
[22] Filed: Feb. 8, 1974
[21] Appl. No.: 440,860

[52] U.S. Cl. .................. 303/21 F; 244/111; 303/10
[51] Int. Cl. .......................... B60t 8/06; B60t 13/16
[58] Field of Search .......... 244/110 A, 111; 303/10, 303/1, 13, 21 F, 21 R, 21 AF, 21 B, 21 BB; 188/181 A, 151 R, 152, 355

[56] References Cited
UNITED STATES PATENTS
2,869,687  1/1959  Keim et al. ........................ 303/21 F
3,718,375  2/1973  Bowler et al. ..................... 303/21 F Primary Examiner—Trygve M. Blix
Assistant Examiner—D. C. Butler
Attorney, Agent, or Firm—Samuel Shiber

[57] ABSTRACT

A system for preventing a wheel lockup of an airplane's landing gear comprising a hydraulic pump driven by the wheel, the pump's discharge is being directed through a metering circuit which permits fluid to flow through it at a rate which is proportional to the airplane's ground speed, the pressure created between the pump and the metering circuit is directed to a brake unit which applies brake torque to the wheel.

7 Claims, 5 Drawing Figures

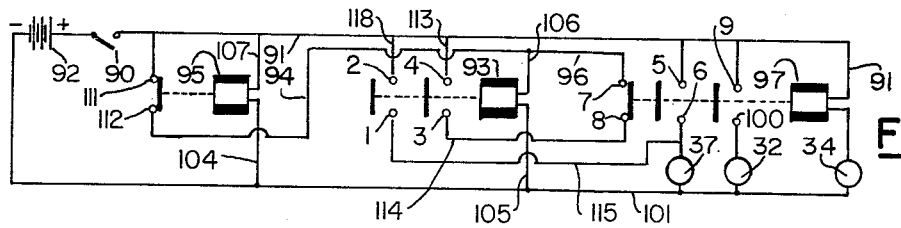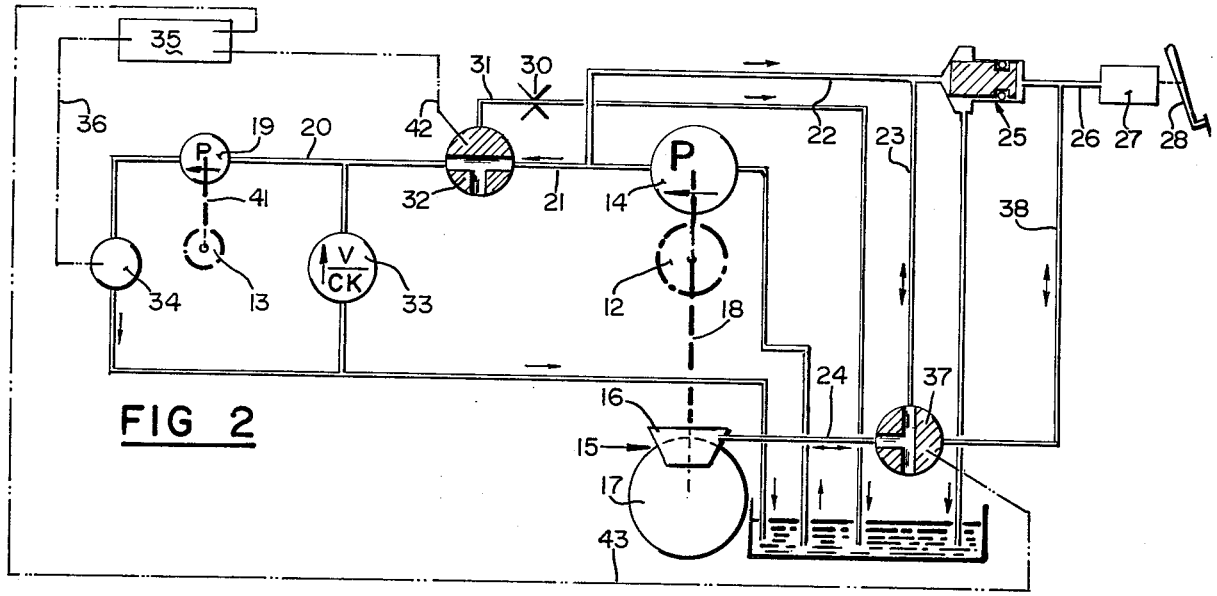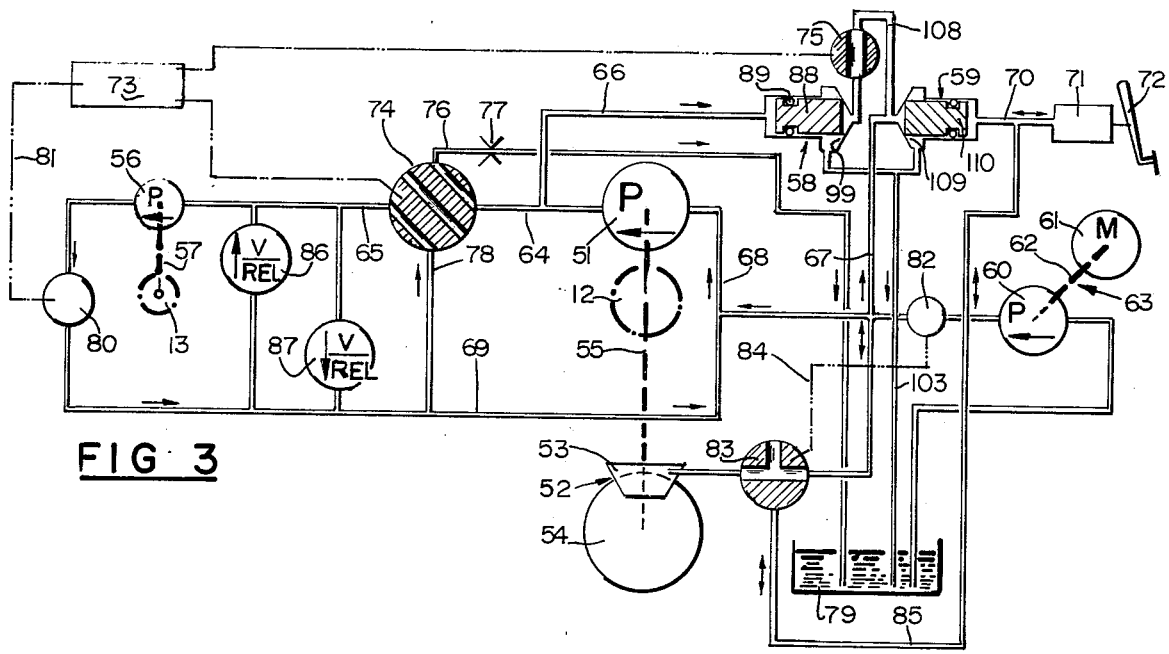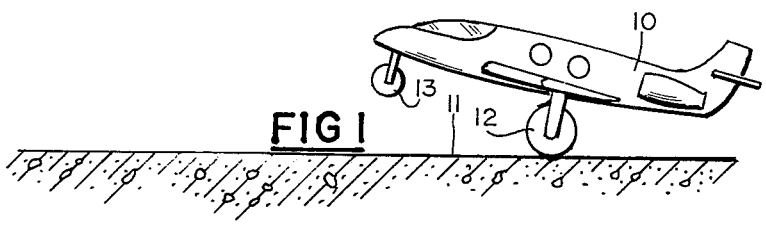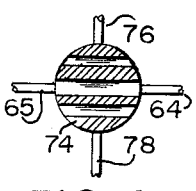

FIXED SLIP HYDRAULIC ANTI-LOCK BRAKING SYSTEM

BACKGROUND OF THE INVENTION

This invention relates to anti-lock, or anti-skid systems, and although not so limited, it particularly concerns such systems as airplane's landing gears.

In an airplane's landing gear the brake system is usually capable of generating sufficient braking torque to lock the airplane's wheels. Such lockup is disadvantageous in several respects:

a. The tire on a locked wheel can be locally abraded and over-heated to a degree that it will have a blow-out and endanger the airplane.

b. When a wheel is locked the airplane's kinetic energy is absorbed in the contact area between the tire and the runway; even if a blow-out does not occur, the tire becomes locally and prematurely worn, economically penalizing the user.

c. A locked wheel shows inferior braking capability along its longitudinal and lateral axes relative to a wheel rotating at a controlled slip rate.

Thus, it has been established that limiting the braking wheel slip (wheel slip is defined as $Va-Vw/Va$ where a Va is airplane's ground speed and Vw is wheel's peripheral speed) to a certain rate will improve the airplane's stability and safety while rolling to a stop on an airport's runway.

One major approach to the design of such systems (which are generally referred to as "anti-lock systems" or "anti-skid systems") consists of three subsystems;

a. a wheel speed sensor, usually in the form of an electronic pick-up at the wheel, b. a logic which receives and processes information from the speed sensor and issues commands to an actuator, and c. an actuator, which according to commands it receives from the logic, releases and then re-applies the brake mechanism.

This approach, as demonstrated by several commercially available systems implementing it, requires a set of complicated, sophisticated and expensive hardware since these systems are normally non-operative until a wheel has actually started to lockup, at which point they attempt to interfere and release the braking torque at the wheel within milliseconds. Almost without exception these sudden brake pressure corrections by these systems result in pulsating brake pressures which pound and stress the brake system and the landing gear.

In contrast to these systems, an object of the present invention is to provide an anti-lock system for an airplane's landing gear which positively attempts to establish a stable equilibrium condition between the braked wheel rotation at a desired optimum slip rate and between the braking torque applied to this wheel, thereby uniformly and controlably braking the wheel, but preventing it from locking under the most insistent pilot's pedal pressure. Thus, the present invention is a hydrualic anti-lock braking system which positively seeks a certain fixed slip.

Another object of the invention is to provide an anti-lock system which eliminates the need for an electronic speed sensor, eliminates the need for a logic and which eliminates the need for a special actuator, but instead contains simple and reliable hydraulic hardware.

SUMMARY OF THE INVENTION

According to the present invention an anti-lock braking system basically comprises a positive displacement hydraulic pump driven by the wheel and therefore pumping through itself a flow at a rate proportional (the term "proportional" as used in this application indicates that two parameters increase or decrease simultaneously but it does not imply that this relationship is necessarily a linear one) to the wheel's angular and peripheral speeds (the "peripheral speed" equals the "angular speed" multiplied by the wheel's radius).

Metering means adapted to permit flow through themselves at a rate which is proportional to an airplane's ground speed, which rate is smaller than the flow rate of the pump (I will refer to the difference between these two rates as "differential pumping") when the peripheral speed of said wheel equals the airplane's ground speed.

A hydraulically actuated brake means, which in certain embodiments may be a conventional friction mechanism of the disc (multi or single) type or drum type, are connected by conduit means to the output port of the pump and to the input port of the metering means.

Now for the purpose of understanding the basic operation of the system it will be assumed that no additional hardware is included in it. It can be seen that an airplane with such a simplified system will upon landing immediately develop the optional slip which is designed into the system, since the differential pumping has to substantially equal zero.

Actually, as the airplane touches down, for a short time the wheel speeds over its optimum slip rate and a positive differential pumping appears, but it instantly builds up pressure in the conduit means which in turn causes the friction mechanism to increase the brake torque that it applies to the wheel which in turn slows the wheel until the positive differential pumping diminishes. As the airplane continues to roll down the runway, spurts of positive or negative differential pressure will continuously appear to effect an increase or a decrease of the braking torque in order to maintain the wheel's rotation at an optimum slip rate in spite of varying friction coefficients (between the wheel and runway as well as within the friction mechanism) and varying loading conditions.

Thus, it can be seen that the basic system causes the wheel to positively seek and assume stable rolling at the optimum slip rate. However, often the pilot will prefer to brake the wheel at less than maximum level. For this purpose manually controlled pressure relief means are added to the system, reducing and limiting the pressure and thereby the brake torque in the system.

A preferred form of metering means comprises a second positive displacement hydraulic pump (from now on I will refer to the previously mentioned pump as the "first pump" and the braked wheel which drives it as the "first wheel") which is driven by a second wheel which is not fully braked, that is, it may be braked to a degree that its rotation at a low slip rate is assured. Preferably, the second wheel will be the nose wheel of the airplane which commonly is equipped with no brakes at all. This arrangement is advantageous since it utilizes the existing nose wheel as the second wheel. However, due to a common landing technique, in the initial stage of landing there is a short period during which the main landing gear wheel (the first wheel) is in contact with the runway while the nose wheel (second wheel) is still in the air. During this period the second pump is not driven and to prevent the first wheel from locking during this period bleeding means is added and connected to said conduit, substituting the second pump as metering means until the second wheel starts rolling on the runway.

The pumps that are used in the system which was discussed so far have to have a relatively stable volumetric efficiency over a wide range of speeds and pressures since they operate as metering means as a source of zero power to actuate the brake means, starting at airplane's landing speed and ending with the airplane almost at stand still, while the airplane may be landing on a dry concrete or an ice-covered runway carrying various loads. Therefore, in a second embodiment of the invention the pumps serve only as metering means while an external pressure source does the actual work of applying the brake means. In this second embodiment the differential pressure across the pump is canceled by the external power source so as to substantially stabilize the pump's volumetric efficiency and allow the use of lower grade (less expensive) pumps.

As airplane's speed diminishes to below a certain speed at which the need and usefulness of the anti-lock system disappear, valving means connect the brake means to a manually controlled brake energizing means (such as a hydraulic brake master-cylinder and a brake pedal) thereby by-passing the anti-lock system.

BRIEF DESCRIPTION OF THE DRAWINGS

FIG. 1 is a general view of an airplane at the initial stage of landing, equipped with an anti-lock braking system according to the present invention, FIG. 2 is a schematic layout of a first embodiment of the present invention, FIG. 3 is a schematic layout of a second embodiment of the present invention, FIG. 4 shows certain details of the hydraulic circuit of FIG. 3.

FIG. 5 shows a schematic layout of an electrical sequencer.

DETAILED DESCRIPTION OF THE FIGURES

An illustrative over-view of the invention is provided by FIG. 1 depicting an airplane 10 at its initial landing stage on a runway 11.

The airplane illustrated in FIG. 1 is a small twin jet business type aircraft having a tricycle type landing gear, with a pair main, braked, wheels 12 (one shown) and a nose, unbraked, steerable wheel 13.

FIG. 2 schematically illustrates a first embodiment incorporating the concepts of the present invention, comprising:
   a first positive displacement hydraulic pump 14 driven by the first wheel 12 through a shaft 18,
   a hydraulically actuated brake means 15 in the form of a disc brake friction mechanism including a stationary caliper 16 attached to the airplane's landing gear and a disc 17 connected to the shaft 18 (which is also connected to the wheel 12 and the first pump 14),
   a second positive displacement hydraulic pump 19 is driven by the second wheel 13 through a shaft 41. The input of this pump is being typically 7 percent to 25 percent less than the output of said first pump 14 when the wheels 12 and 13 are rotating at equal peripheral speeds and conduit means 20, 21, 22, 23 and 24 connecting an output port of the second pump 19 and with the caliper 16.

The system regulates the braking of the first wheel 12 so as to maintain a zero differential pumping and thereby it maintains the first wheel 12 braked at the desired slip rate as was previously discussed in the Summary of the Invention.

The system described above causes the wheel to automatically and positively seek the slip rate that is designed into it, however, often less than maximum braking is required by the airplane's pilot. Therefore, a manual pressure relief valve 25 is connected to the conduit means 22 for limiting the pressure in it in proportion to a pressure signal developed by the pilot in the line 20 by means of a master-cylinder 27 connected to a brake pedal 28.

This pressure relief valve 25 serves to regulate the pressure in the conduit means 20, 21, 22, 23 and 24 allowing the pilot to manually over-rule and reduce (but only reduce) the pressure in the conduit means.

Modern airplanes having tricycle type landing gear commonly bring their first (main) wheels 12 in contact with the runway before bringing their second (nose) wheel 13 into contact with the runway. Thus there is a short period at the initial stage of landing during which the second pump 19 does not operate, and during which the first wheel 12 may lock should the pilot heavily depress the brake pedal 28. To prevent such an occurence a bleeding means in the form of an orifice, preferably of the temperature compensating type, 30 is connected via a line 31 to a three-way solenoid operated valve 32 which communicates a line 31 to conduit means 21 during the initial landing period. During this period the orifice 30 substitutes the pump 19, that is, there is no flow from conduit means 21 to the input of pump 19 and the flow from conduit means 21 is passing through orifice 30 to the sump 79. As the airplane's second (nose) wheel 13 is lowered the second pump 19 starts sucking fluid through a check valve 33 and discharging it through a flow switch 34, which becomes closed in response to a certain flow passing it, which in turn energizes a sequencer unit 35 through a wire 36 that in turn responds by energizing the solenoid operated valve 32 through a wire 42 which connects conduit means 20 and 21, one to the other (the sequencer operation will be discussed later on).

The flow switch 34 continues to monitor the airplane's ground speed, and as it slows down to below a certain speed the flow switch 34 causes the sequencer to de-energize a solenoid operated valve 37 through a wire 43 which in turn connects conduit means 24 to a line 38. In this position the caliper 16 is connected directly to the master-cylinder 27, which is a preferred arrangement at low speeds.

A second embodiment incorporating the concepts of the present invention is shown in FIG. 3. The major difference between the two embodiments is that in the first embodiment the pressure prevailing between the outlet port of the first pump and the inlet port of the second pump is used to activate the brake means directly, where in the second embodiment, it is used only as a signal pressure (due to this similarity, the discussion of portions of the second embodiment that are self-explanatory, in view of the first embodiment, will be avoided). The second embodiment will be discussed hereafter in relation to the airplane 10 of FIG. 1 that was used to illustrate the first embodiment.

The second embodiment comprises:

- a first positive displacement pump 51 driven by the first wheel 12 through a shaft 55,
- a hydraulic brake means 52 including a caliper 53 and a disc 54 which is connected to the shaft 55,
- a second positive displacement hydraulic pump 56 driven by the second wheel 13 through a shaft 57, the first and second pump being sized on relative to the other as in the first embodiment, however, in this embodiment their absolute capacity can be smaller since they do not have to fill-up the caliper 53, but merely to provide a pressure signal to a relief means 58 which can be designed to require very small volumetric input for its activation,
- a pressure source 63 including a pump 60 driven by a motor 61 through a shaft 62 and relief means 58 by which the output pressure from the pump 60 can be made to follow a signal pressure,
- conduit means 64, 65 and 66 for connecting an output port of the first pump 51 with an input port of the second pump 56 and for directing the pressure signal to the relief means 58, and
- fluid transmitting means 67, 68 and 69 for connecting the pressure source 63 with input port of the first pump 51 with an output port of the second pump 56 and with the caliper 53.

The system operates by regulating the first wheel's braking so as to cause the first pump's output to substantially equal (that is, allowing for varying volumetric efficiencies and momentary flow fluctuations, etc.) the output of the second pump 56.

Manual pressure relief valve 59 is added and connected to the fluid transmitting means 67 for limiting the pressure in it in proportion to a pressure signal developed by the pilot in line 70 by means of a master-cylinder 71 connected to a brake pedal 72.

The relief valve 59 allows the pilot to over-rule the system manually and reduce the pressure in the caliper 53 (pilot's over-ruling of the system applied only to a reduction of the pressure in the caliper). This is done by the pilot increasing or decreasing the pressure signal developed in line 70 (when the pilot pushes or releases the pedal 72 respectively), thus causing piston 110 in relief valve 59 to move leftwards or rightwards respectively, and by this movement closing or enlarging respectively orifice 109, thus increasing or decreasing respectively the pressure in fluid transmitting means 67 and in the caliper 53.

In the second embodiment, since the pressure in the fluid transmitting means 69 follows the pressure in conduit means 65, the pumps 51 and 56 volumetric efficiency is not degraded by a pressure drop across themselves. Further, a pair of relief valves 86 and 87 limit the differential pressure between the lines 65 and 69 against the pressure spikes that may appear in conduit means 65.

As has been mentioned before the relief means 58 requires small volumetric signals which cause movement of a piston 88 carrying a seal 89 since when the piston 88 moves away slightly from a conical seat 99 it opens a relatively large opening (relief means 59 and 25 are constructed in a similar manner to minimize the volumetric requirement they impose on the master-cylinders 71 and 27, respectively). The pressure prevailing in the output port of pump 51 is transmitted to the lefthand face of piston 88. When this pressure increases or decreases the piston 88 moves rightwards or leftwards respectively, thus closing or opening respectively the orifice formed between the peripheral edge of the righthand face of piston 88 and the conical seat 99, thus decreasing or increasing respectively the flow from line 67 and line 108 (through relief means 58 and line 103) to sump 79 and thus increasing or decreasing respectively the braking pressure in caliper 53.

The second embodiment, similarly to the first embodiment, has three operational modes to match the three phases of the landing process; touching down, decelerating and final stopping. The system is switched from one mode to another by a sequencer 73 which controls a four-way solenoid operated valve 74 and a two-way solenoid operated valve 75.

During the first mode of operation the valve 75 is kept open and the valve 74 communicates conduit means 64 with a line 76 and conduit means 65 with a line 78. Thus, when the airplane touches down only with its first wheel 12, as was previously discussed, the output of pump 51 is directed through an orifice 77 back to the reservoir 79. The resulting pressure developed across the orifice 77 governs the braking pressure appearing in the caliper 53 and brakes the wheel 12 effectively and uniformly, although not necessarily at an optimum slip rate. (It is understandable that with this arrangement the wheel can not lock since if it did, the output of pump 51 would diminish and so would the pressure across the orifice 77).

As the second wheel 13 starts rolling on the runway 11 the pump 56 starts circulating fluid across a flow switch 80 closing it, thereby sending a signal to the sequencer 73 through a wire 81. The sequencer 73 responds by switching the valve 74 to a position shown in FIG. 4 wherein it connects conduit means 64 with conduit means 65 while blocking the lines 76 and 78. At this point the system starts its major mode of operation.

As the airplane slows down below a certain predetermined speed the flow switch 80 re-opens and in response the sequencer switches the solenoid operated valve 74 to its previous position, shown in FIG. 3 and also shuts the solenoid operated valve 75. Consequently, the pressure in the fluid transmitting means is not effected any more by the relief means 58 and the pressure regulation therein is left to the pilot through the relief means 59.

A safety feature to back-up the pressure source 63 is provided in the form of a flow switch 82 which upon sensing failure of the pressure source causes the solenoid operated valve 83 through a wire 84 to connect the caliper 53 to a line 85 and thereby directly to master-cylinder 71.

An electrical sequencer which serves the first embodiment is shown in FIG. 5. This sequencer operates as follows:

In preparation for landing a switch 90 is closed (an existing switch on the airplane such as the switch used to lower the landing gear can additionally serve the sequencer circuit as switch 90) energizing a wire 91 from a battery 92 thereby energizing a solenoid 93 (all three relays shown in FIG. 5 are shown in their normally de-energized position) through a wire 94 and a wire 106, and shortly thereafter (the time delay depends upon the characteristics of the chosen solenoid 95) energizing a solenoid 95 through a wire 107 and thereby de-energizing the wire 94 by disconnecting terminals 111 and 112.

However, once the solenoid 93 closes, it self-energizes through a wire 96 (which is connected via terminals 7 and 8, wire 114, terminals 3 and 4 now connected, and wires 113 and 91 to the positive terminal of battery 92), also energizing the solenoid operated valve 37 (through a wire 115 terminals 1 and 2 now connected, and wire 91 which is connected to the positive terminals of battery 92).

At this condition the system is at its first mode of operation, being ready for the touch down phase of the landing. After the touch down and after the nose wheel rotation reaches a certain peripheral speed, (for example, 50 percent of the airplane's approximate touch down speed) the flow switch 34 closes because an adequate flow is now flowing through flow switch 34, energizing a solenoid 97 which in turn de-energizes the solenoid 93 by disconnecting terminals 7 and 8 which keep solenoid 93 energized, and thus disconnecting wire 96 from the positive terminal of battery 92, and at the same time energizing the solenoid operated valve 32 by connecting terminals 9 and 100 and re-energizing the solenoid operated valve 37 by connecting terminals 5 and 6. Now the system is at its second, major, mode of operation.

As the airplane slows down to below a certain speed (for example, to a speed below 15 percent of its touch down speed) the flow switch 34 re-opens de-energizing solenoid operated valves 32 and 37 by disconnecting terminals 100 and 9, and terminals 5 and 6 respectively, at which point the system is at its third mode of operation.

As discussed, the flow switch 34 has an hysteresis between its closing and re-opening points. Such switches are commercially available (also note for reference U.S. Pat. No. 3,762,492 FIGS. 5 and 6).

The sequencer discussed above can serve the second embodiment, as can be seen by substituting the flow switch 34 with the flow switch 80, the solenoid operated valve 32 with solenoid operated valve 74 and the solenoid operated valve 37 with the solenoid operated valve 75.

While the present invention has been described with reference to particular embodiments it is understood that modifications and variations can be made, by those skilled in the art, without departing from the spirit of the invention or the scope of the claims.

I claim:

1. In an airplane landing gear of the type having a first, braked wheel, and a second, less than fully braked wheel, an anti-lock braking system comprising in combination;
   a first positive displacement hydraulic pump driven by said first wheel,
   a hydraulically actuated brake means for braking said first wheel,
   a second positive displacement hydraulic pump driven by said second wheel, the output of said second pump being less than the output of said first pump when said wheels are rotating at equal peripheral speeds, and
   conduit means connecting an output port of said first pump with the input port of said second pump and with said brake means,
   wherein said first wheel's braking is regulated by said system so as to cause said first pump's output to substantially equal to said second pump's input.

2. A system as in claim 1 wherein manual pressure relief means are added and connected with said conduit means for manually reducing and limiting the pressure prevailing in said conduit means and thereby overruling said system.

3. A system as in claim 1 wherein a bleeding means is added and connected to said conduit means for metering out of said conduit substituting the second pump in the initial stage of the airplane's landing during which the first wheel is in contact with a runway and said second wheel is not,
   and valving means adapted to shut said bleeding means after said second wheel has established contact with the runway.

4. In an airplane's landing gear having a braking wheel, an anti-lock braking system comprising in combination;
   a positive displacement hydraulic pump driven by said wheel,
   a hydraulically actuated brake means for braking said wheel,
   a metering means adapted to permit flow through itself at a rate which is proportional to airplane's ground speed and which is smaller than the output of said pump when the peripheral speed of said wheel equal's the airplane's ground speed,
   manual pressure relief means for manually overruling said system, and
   conduit means connecting an output port of said pump to an input port of said metering means with said brake means and with said manual pressure relief means,
   wherein said wheel's braking is regulated by said system so as to cause said pump's output to substantially equal the flow permitted by said metering means through itself and wherein said manual pressure relief means are adapted to manually reduce and limit the pressure prevailing in said conduit means thereby over-rule said system.

5. In an airplane landing gear of the type having a first, braked wheel, and a second, less than fully braked wheel, an anti-lock braking system comprising in combination;
   a first positive displacement hydraulic pump driven by said first wheel,
   a hydraulically actuated brake means for braking said first wheel,
   a second positive displacement hydraulic pump driven by said second wheel, the output of said second pump being less than the output of said first pump when said wheels are rotating at equal peripheral speeds,
   a pressure source equipped with relief means by which its pressure output can be made to follow a signal pressure,
   conduit means for connecting an output port of said first pump with an input port of said second pump and with said relief means for directing said signal pressure to said relief means, and
   fluid transmitting means for connecting said pressure source with an input port of said first pump, with an output port of said second pump and with said brake means, wherein said first wheel's braking is regulated by said system so as to cause said first pump's output to substantially equal said second pump's input.

6. A system as in claim 5 wherein a manual pressure relief means is added and connected to said fluid transmitting means for manually reducing and limiting the pressure prevailing in said fluid transmitting means and thereby over-ruling said system.

7. A system as in claim 5 wherein a bleeding means is added and connected to said conduit means for metering out of said conduit means flow and thereby substituting said second pump in the initial stage of the airplane's landing during which the first wheel is in contact with a runway and said second wheel is not, and valving means adapted to shut said bleeding means after said second wheel has established contact with the runway.

* * * * *

UNITED STATES PATENT OFFICE
CERTIFICATE OF CORRECTION

Patent No. 3,881,783      Dated May 6, 1975

Inventor(s) Samuel Shiber

It is certified that error appears in the above-identified patent and that said Letters Patent are hereby corrected as shown below:

The third Assignee, should read -- Samuel Shiber --.

Column 2, line 30, "optional" should read -- optimal --.

Column 3, line 12, "means as" should read -- means and as --;

Column 3, line 13, "zero" should read -- servo --.

Column 4, line 17, "20" should read -- 26 --.

Column 4, line 31, "occurence" should read -- occurrence --.

Column 5, line 10, "pump" should read -- pumps --.

Column 5, line 10, "on" should read -- one --.

Claim 1, line 57, "hydrualic" should read -- hydraulic --.

Signed and Sealed this twenty-fifth Day of November 1975

[SEAL]

Attest:

RUTH C. MASON
*Attesting Officer*

C. MARSHALL DANN
*Commissioner of Patents and Trademarks*